(12) United States Patent
Neil et al.

(10) Patent No.: US 7,740,362 B1
(45) Date of Patent: Jun. 22, 2010

(54) MIRROR WITH THERMALLY CONTROLLED RADIUS OF CURVATURE

(75) Inventors: George R. Neil, Williamsburg, VA (US); Michelle D. Shinn, Newport News, VA (US)

(73) Assignee: Jefferson Science Associates, Newport News, VA (US)

( * ) Notice: Subject to any disclaimer, the term of this patent is extended or adjusted under 35 U.S.C. 154(b) by 48 days.

(21) Appl. No.: 12/070,522

(22) Filed: Feb. 19, 2008

(51) Int. Cl.
 *G02B 5/08* (2006.01)
 *G02B 7/185* (2006.01)
 *G02B 7/195* (2006.01)

(52) U.S. Cl. .................. 359/845; 359/846; 359/848

(58) Field of Classification Search ........... 359/845, 359/846, 848, 847
See application file for complete search history.

(56) References Cited

U.S. PATENT DOCUMENTS

| | | | | |
|---|---|---|---|---|
| 1,530,441 A | * | 3/1925 | Thomson | 359/845 |
| 3,488,110 A | * | 1/1970 | Evoy | 359/840 |
| 4,190,327 A | * | 2/1980 | Hughes | 359/845 |
| 4,253,739 A | * | 3/1981 | Carlson | 359/845 |
| 4,357,077 A | * | 11/1982 | Yevick | 359/633 |
| 4,431,269 A | * | 2/1984 | Barnes, Jr. | 359/845 |
| 4,772,110 A | * | 9/1988 | Roszhart | 359/845 |
| 5,004,319 A | * | 4/1991 | Smither | 359/570 |
| 5,073,831 A | * | 12/1991 | Flint | 359/845 |
| 5,390,228 A | * | 2/1995 | Niibe et al. | 378/34 |
| 5,889,256 A | * | 3/1999 | Osanai | 219/121.74 |
| 6,846,086 B2 | * | 1/2005 | Goldstein | 359/846 |
| 6,986,585 B1 | * | 1/2006 | Neil et al. | 359/845 |
| 7,329,014 B2 | * | 2/2008 | Balogh et al. | 359/845 |
| 7,349,063 B2 | * | 3/2008 | Miyajima | 355/30 |

FOREIGN PATENT DOCUMENTS

JP 61-243404 * 10/1986

* cited by examiner

*Primary Examiner*—Ricky D Shafer

(57) ABSTRACT

A radius of curvature controlled mirror for controlling precisely the focal point of a laser beam or other light beam. The radius of curvature controlled mirror provides nearly spherical distortion of the mirror in response to differential expansion between the front and rear surfaces of the mirror. The radius of curvature controlled mirror compensates for changes in other optical components due to heating or other physical changes. The radius of curvature controlled mirror includes an arrangement for adjusting the temperature of the front surface and separately adjusting the temperature of the rear surface to control the radius of curvature. The temperature adjustment arrangements can include cooling channels within the mirror body or convection of a gas upon the surface of the mirror. A control system controls the differential expansion between the front and rear surfaces to achieve the desired radius of curvature.

1 Claim, 5 Drawing Sheets

MIRROR WITH THERMALLY CONTROLLED RADIUS OF CURVATURE

The United States of America may have certain rights to this invention under Management and Operating Contract No. DE-AC05-85ER 40150 from the Department of Energy.

FIELD OF THE INVENTION

This invention relates to control systems for light reflecting or light transmitting mirrors and specifically to a mirror having a simplified thermal control system for adjusting its radius of curvature.

BACKGROUND OF THE INVENTION

It is often necessary to control the radius of curvature of a mirror in order to control precisely the location of the focal point occurs. This is important, for example, when using laser beams for machining or to compensate for changes in other optical components due to heating or other physical changes.

Among the various methods commonly used to achieve such control of the radius of curvature of a mirror are those that utilize pressure on the rear surface of the mirror while the periphery of the mirror is held in a constant position, thus resulting in the desired corrective distortion of the mirror. Such methods include those disclosed in: U.S. Pat. No. 6,021,153 to Okada, issued Feb. 1, 2000 that describes a variable-curvature reflecting mirror in which the radius of curvature is adjusted with a piezoelectric actuator that applies pressure against the back of the mirror; U.S. Pat. No. 6,253,619 to Danyluk et al., issued Jul. 3, 2001 that describes an adjustable acoustic mirror in which the radius of curvature is adjusted with a screw, rod, or voltage modulator; and U.S. Pat. No. 6,464,364 to Graves et al., issued Oct. 15, 2002 that describes a deformable curvature mirror in which the deformation is controlled by applying electrical voltages to electrode segments on the back of the mirror.

While each of these and similar prior art devices attempt to provide control of the radius of curvature of a mirror, they are substantially complex mechanically and consequently expensive to implement and often do not provide the desired perfectly spherical distortion of the mirror.

There is therefore, a need for a relatively simple radius of curvature control system that provides nearly spherical distortion of the mirror in response to external influences, especially heating such as that caused by laser beams.

SUMMARY OF THE INVENTION

The invention is a radius of curvature controlled mirror for controlling precisely the focal point of a laser beam or other light beam. The radius of curvature controlled mirror provides nearly spherical distortion of the mirror in response to differential expansion between the front and rear surfaces of the mirror. By controlling the radius of curvature, the mirror of the present invention compensates for changes in other optical components due to heating or other physical changes. The radius of curvature controlled mirror includes an arrangement for adjusting the temperature of the front surface and separately adjusting the temperature of the rear surface to control the radius of curvature. The temperature adjustment arrangements can include cooling channels within the mirror body or convection of air or a gas upon the surface of the mirror. A control system controls the differential expansion between the front and rear surfaces to achieve the desired radius of curvature.

OBJECT OF THE INVENTION

It is therefore an object of the present invention to provide a relatively simple to implement radius of curvature control device for a mirror, which device provides nearly spherical distortion of the mirror in response to differential expansion between the front surface and the rear surface of the mirror. The radius of curvature control system is mechanically simple and avoids the use of expensive and mechanically complex components such as piezoelectric actuators.

These and other objects and advantages of the present invention will be better understood by reading the following description along with reference to the drawings.

Figure 1:
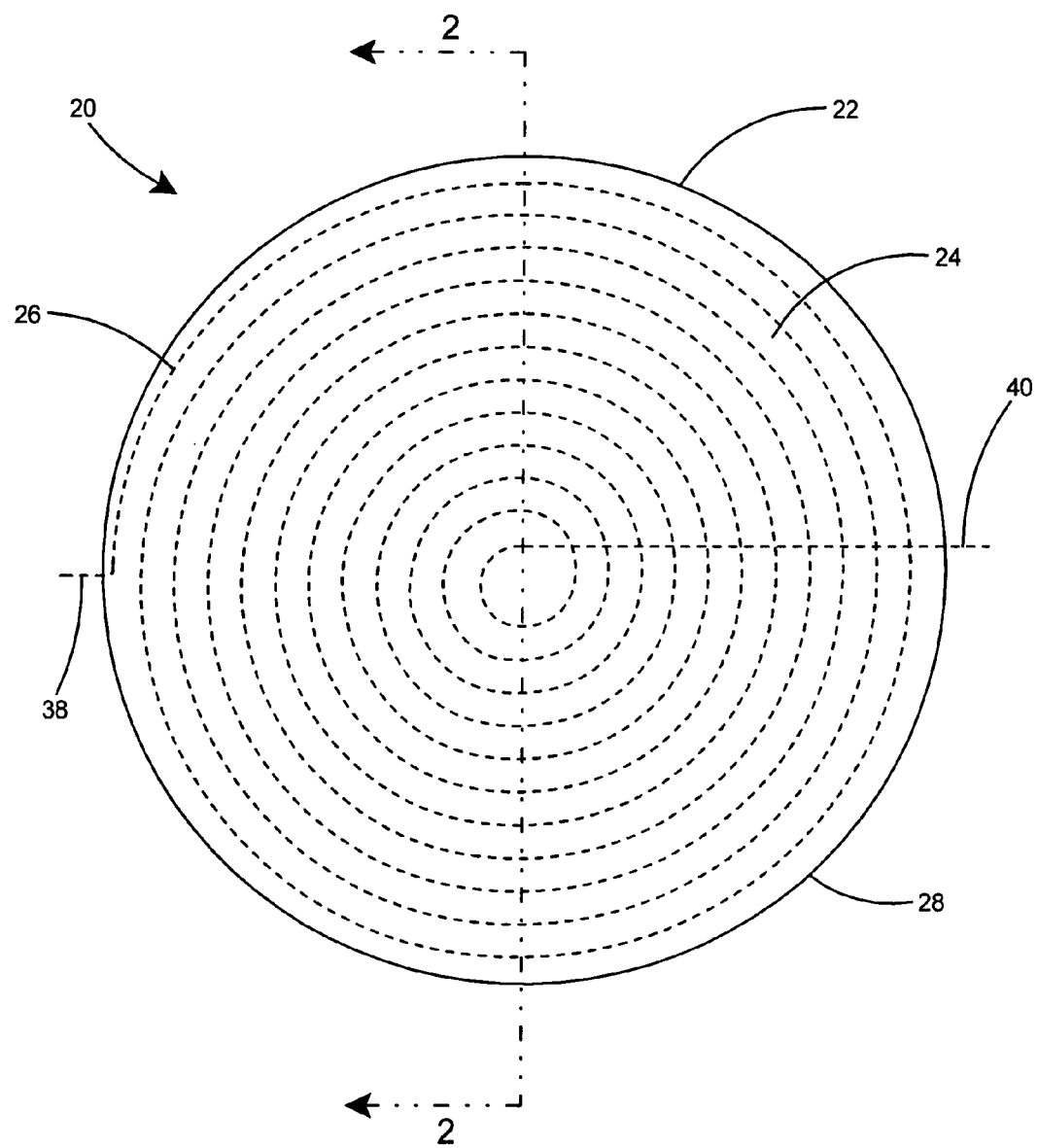
FIG. 1 is a front elevation view of a preferred embodiment of a thermally controlled radius of curvature reflecting mirror according to the present invention depicting one of the internal cooling loops in dashed lines.

TABLE OF NOMENCLATURE
The following is a listing of part numbers used in the drawings along with a brief description:

20 thermally controlled radius of curvature mirror, first embodiment
22 mirror body
24 front surface
26 front cooling loop
28 perimeter of mirror body
30 rear surface
32 rear cooling loop
34 front passageway
36 rear passageway
38 front inlet port
40 front outlet port
42 rear inlet port
44 rear outlet port
45 light
46 direction of expansion of rear surface
47 control system or controller
48 fluid
50 pump
52 heat exchanger
54 control valve for front cooling loop
56 control valve for rear cooling loop
58 sensor for front cooling loop
60 sensor for rear cooling loop
62 feedback for front cooling loop
64 feedback for rear cooling loop
66 thermally controlled radius of curvature mirror, second embodiment
68 reflective mirror
70 cooling loop
72 front surface
74 heat -continued TABLE OF NOMENCLATURE
The following is a listing of part numbers used in the drawings along with a brief description:

76 rear surface
78 inlet port
80 outlet port
82 laser beam or incident light
84 directional arrow, direction of expansion or contraction
86 thermally controlled radius of curvature mirror, third embodiment
88 front surface
90 rear surface
92 front edge of mirror body
94 rear edge of mirror body
96 mirror body
98 mounting ring
100 front side of mounting ring
102 rear side of mounting ring
104 front cooling channel
106 rear cooling channel
108 incident light
110 circumferential cut
112 front portion of mounting ring
114 rear portion of mounting ring
116 directional arrow
118 front inlet port
120 front outlet port
122 rear inlet port
124 rear outlet port
T1 temperature of fluid

DETAILED DESCRIPTION OF THE INVENTION

With reference to FIG. 1 there is shown a preferred embodiment of the present invention, a thermally controlled radius of curvature mirror 20. The thermally controlled radius of curvature mirror 20 includes a mirror body 22 with a front surface 24. The mirror body 22 may be constructed of silicon, silicon carbide, sapphire, copper, or similar materials that are typically used as mirrors to reflect or transmit light. The mirror body 22 of the thermally controlled radius of curvature mirror 20 includes a front cooling loop 26, shown in dashed lines, within the mirror body 22 and located substantially near the front surface 24. Although the mirror body 22 of FIG. 1 is depicted as a circular shape as shown by perimeter 28, the mirror could include other shapes such as square, hexagonal, octagonal, or elliptical. Although the front cooling loop 26 is of spiral shape in the embodiment shown in FIG. 1, the cooling loops could be of other shapes without departing from the scope of the invention. Although the front surface of the mirror is flat as shown in FIG. 1, it could also be convex or concave without departing from the scope of the invention.

Figure 2:
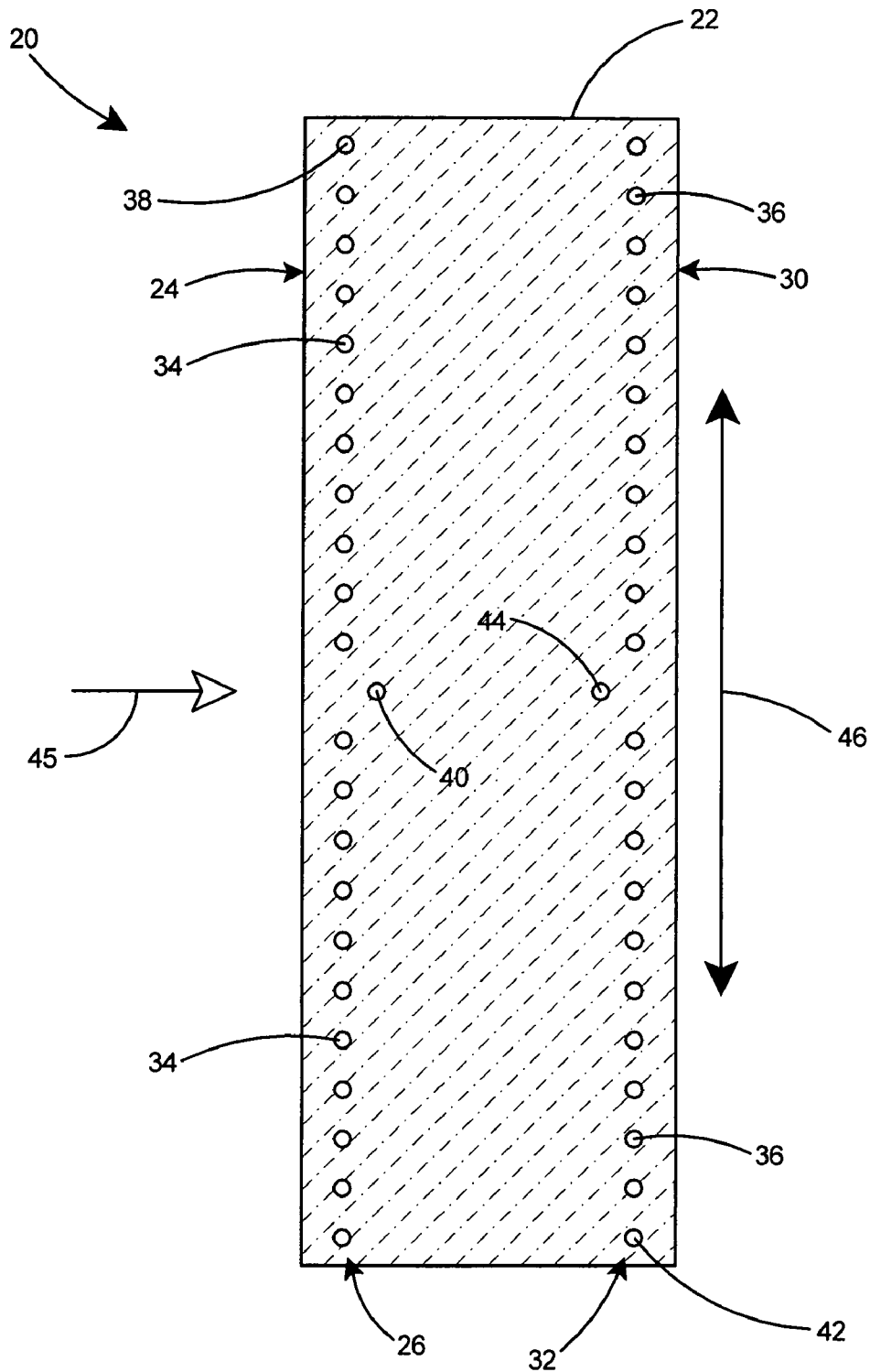
FIG. 2 is a sectional view of the thermally controlled radius of curvature mirror device taken along line 2-2 of FIG. 1 and depicting the reflecting mirror and two cooling loops.

Referring to FIG. 2 which depicts a sectional view of the preferred embodiment of the thermally controlled radius of curvature mirror 20, the mirror body 22 further includes a rear surface 30 and a rear cooling loop 32 located within the mirror body 22 substantially near the rear surface 30. The front cooling loop 26 includes a plurality of front passageways 34 in the mirror body 22 for the flow of coolant and the rear cooling loop 32 includes a plurality of rear passageways 36 in the mirror body 22 adjacent to or substantially close to the front surface 24. The front cooling loop 26 includes a front inlet port 38 and a front outlet port 40 and the rear cooling loop 32 includes a rear inlet port 42 and a rear outlet port 44. The mirror body 22 is depicted with light 45 incident on the front surface 24. Directional arrow 46 depicts the direction of expansion of the rear surface 30 of the mirror 20 as the temperature of the rear surface is raised in order to control the radius of curvature of the front surface 24. As the rear surface 30 expands, the radius of curvature of the front surface 24 decreases.

Figure 3:
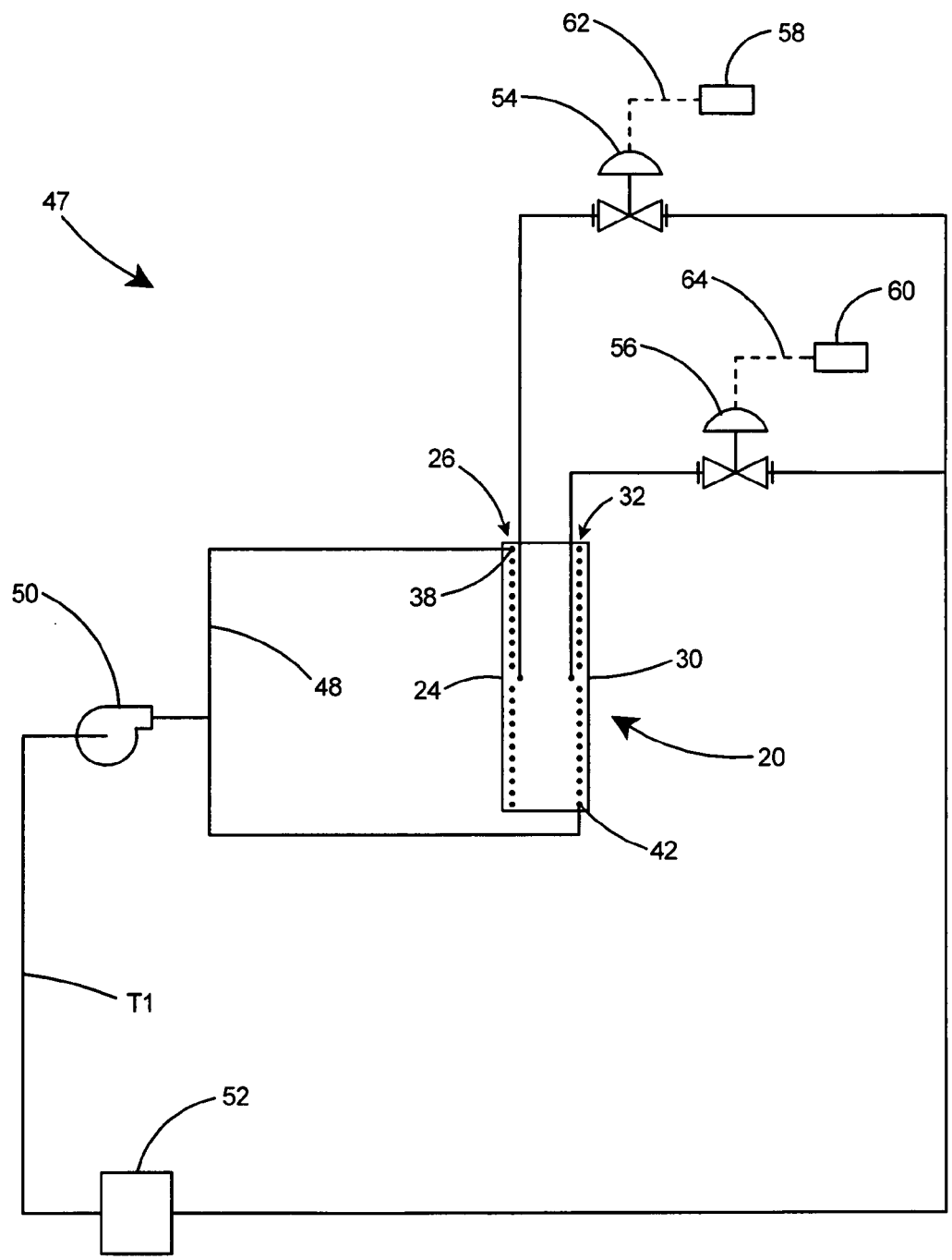
FIG. 3 is a schematic depicting a control system or controller for the controlled radius of curvature of mirror device of FIG. 2.

With reference to FIG. 3, there is shown a control circuit system or controller 47 for the controlled radius of curvature mirror device 20 of FIG. 2. A fluid 48 is pressurized by a pump 50 that pumps the fluid through the front cooling loop 26 and rear cooling loop 32. The fluid is cooled to temperature T1 by a heat exchanger 52. Two automatic control valves 54 and 56 are positioned on the downstream side of the cooling loops 26 and 32. Control valve 54 receives a signal from sensor 58 and control valve 56 receives a signal from sensor 60. Each of the sensors 58 and 60 send a signal through their respective feedback loops 62 and 64 to control the amount of coolant fluid flowing through the front and rear cooling loops 26 and 32. In this manner the differential expansion between the front surface 24 and the rear surface 30 is achieved by having two sets of cooling channels 26 and 32, one near the front surface 24 and one near the rear surface 30. By controlling the flow and/or temperature in each set individually, the front surface 24 can be kept warmer than the back surface or vice versa. By controlling the differential expansion of the front surface 24 and rear surface 30 of the mirror, the radius of curvature can be increased or decreased.

In the system depicted in FIG. 3, the differential expansion between the front surface 24 and the rear surface 30 is achieved with the two sets of cooling channels, including front cooling loop 26 near the front surface 24 and rear cooling loop 32 near the rear surface 30. By controlling the flow and/or temperature in each cooling loop 26 and 32 individually, the front surface 24 can be kept warmer than the rear surface 30 or vice versa. By controlling expansion of the front 24 and rear 30 surfaces of the mirror body 22, the radius of curvature can be increased or decreased. The system depicted in FIG. 3 employs differential thermal expansion to vary the radius of curvature of the mirror.

Figure 4:
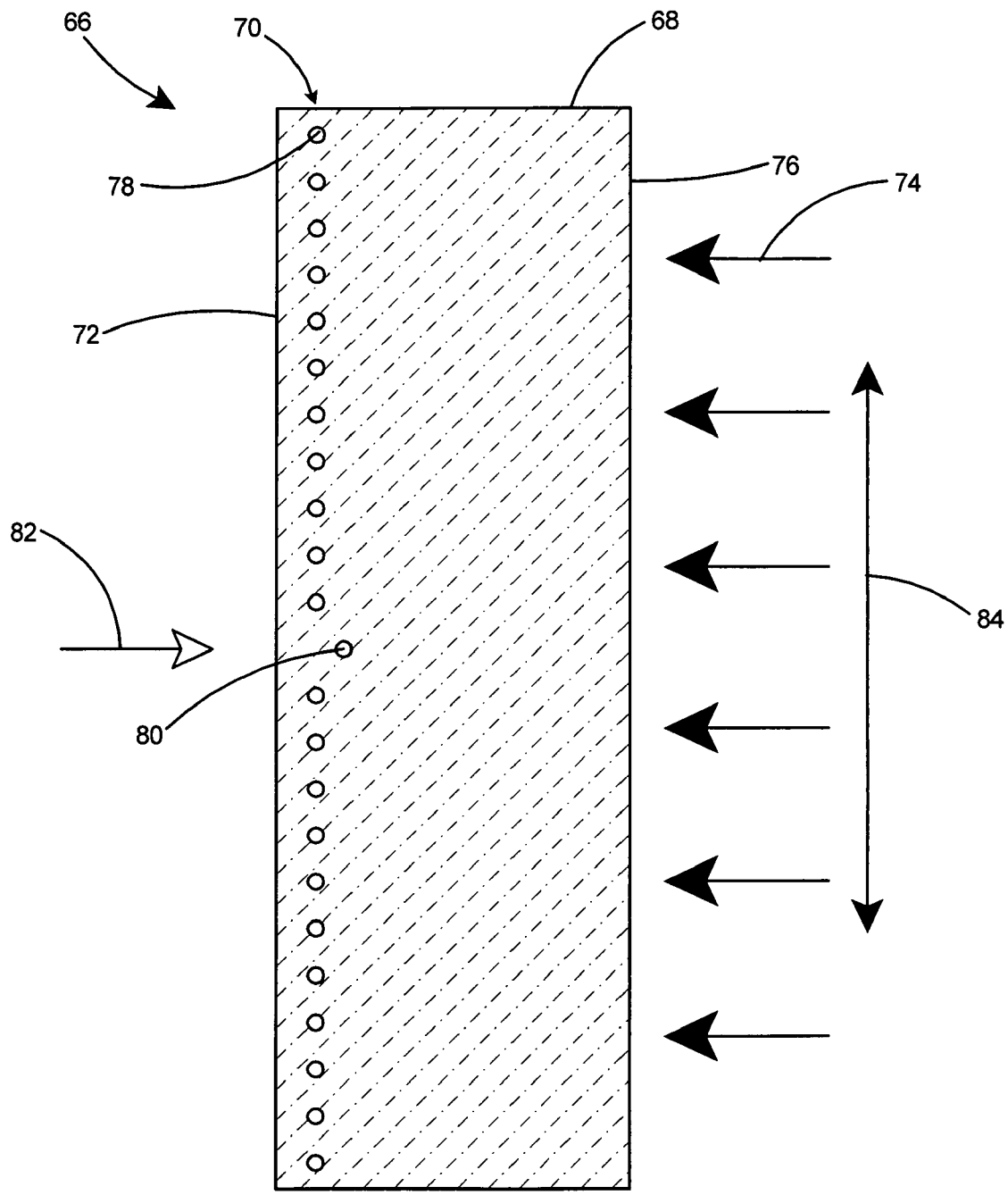
FIG. 4 is a sectional view of a second embodiment of a thermally controlled radius of curvature mirror device including a reflective mirror according to the present invention with one cooling loop and differential heat applied to the rear surface of the mirror.

Referring to FIG. 4 there is shown a sectional view of a second embodiment of a thermally controlled radius of curvature mirror device 66 including a reflective mirror 68 according to the present invention with one cooling loop 70 near the front surface 72 and a controlled amount of heat 74 applied to the rear surface 76 of the mirror 68. The cooling loop 70 includes an inlet port 78 and an outlet port 80. A controlled amount of heat 74 is applied to the rear surface 76 to provide a differential temperature across the optic thickness and thereby generate a change in the radius of curvature. If the rear surface 76 is warmer than the cooled front surface 72, the rear surface 76 expands and the radius of curvature seen by the laser beam 82 on the front surface 72 decreases. Conversely, if the rear surface 76 is cooler than the cooled front surface 72, the rear surface 76 contracts and the radius of curvature encountered by the laser beam 82 on the front surface 72 increases. The direction of expansion or contraction of the rear surface 76 of the mirror 68 is depicted by directional arrow 84.

Figure 5:
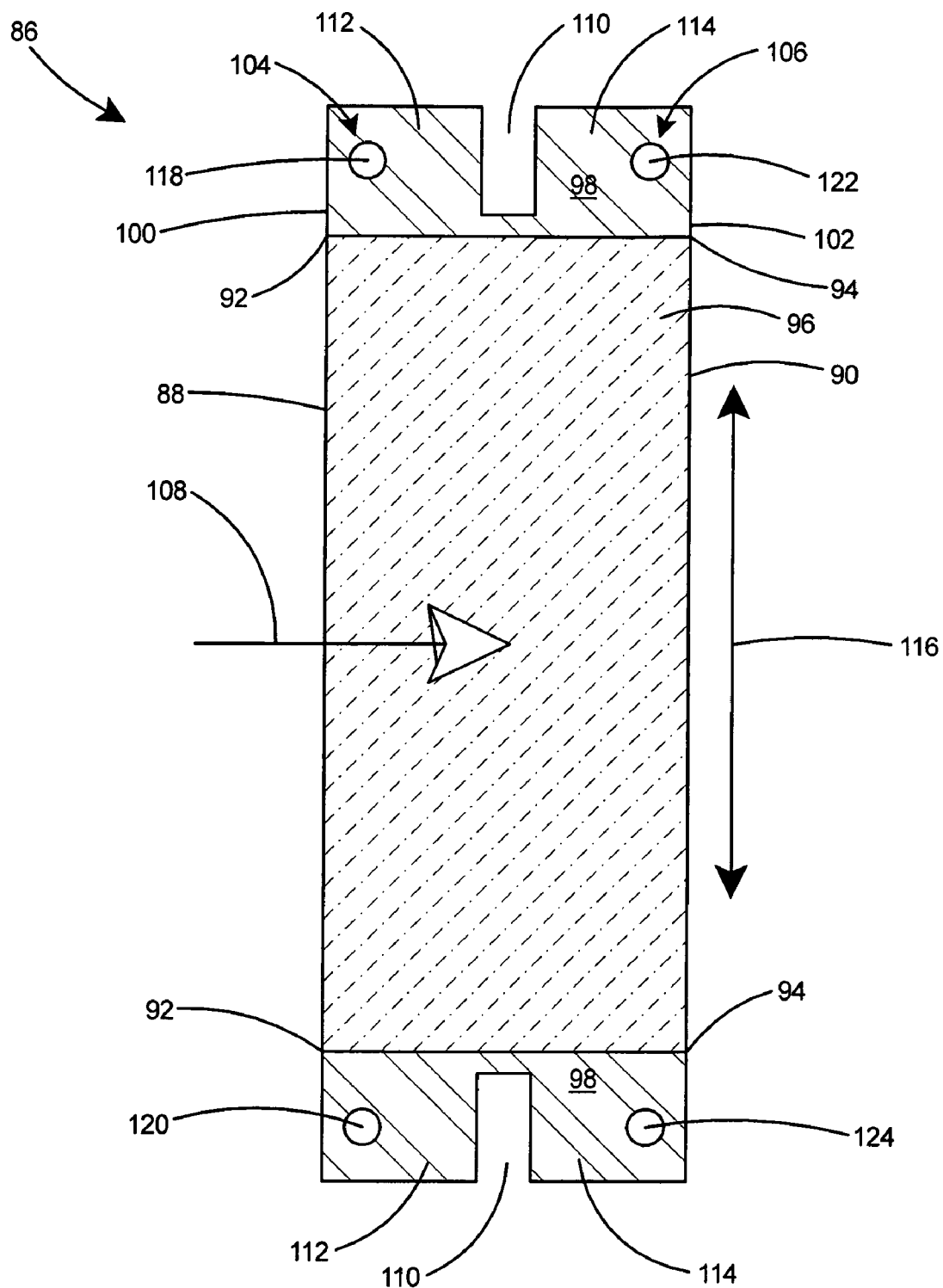
FIG. 5 is a sectional view of a third embodiment of a thermally controlled radius of curvature mirror according to the present invention including a transmissive mirror with circumferential cooling.

FIG. 5 is a sectional view of a third embodiment of a thermally controlled radius of curvature mirror 86 according to the present invention that applies the concept of differential expansion between the front surface 88 and rear surface 90 to transmissive optics. The thermally controlled radius of curvature mirror 86 of FIG. 5 includes circumferential cooling with different temperatures on the front edge 92 and rear edge 94 of the mirror body 96 to increase or decrease the radius of curvature. The transmissive mirror 96 includes a mounting ring 98 with a front side 100 and a rear side 102 and a front cooling channel 104 and a rear cooling channel 106. Light 108 is directed to the front surface 88 of the mirror 96 with a portion passing there through. In the third embodiment shown in FIG. 5, the mounting ring 98 is circular shaped and a circumferential cut 110 is provided as shown to reduce thermal conductivity between the front 112 and rear 114 portions of the mounting ring 98. The change in radius of curvature results from both the difference in temperature front to back of the optic or mirror body 96 as well as the difference in coefficient of expansion between the mirror material and the mounting ring 98 with cooling/heating channels 104 and 106. Although the thermally controlled radius of curvature mirror 86 of FIG. 5 is described with cooling channels 104 and 106, it should be understood that heating channels could be used in place of cooling channels to achieve control of the radius of curvature of the mirror 96. In the system depicted in FIG. 5, a difference in temperature between the front cooling channel 104 and the rear cooling channel 106 in the mounting ring 98 creates a differential expansion between the front surface 88 and rear surface 90 of the mirror body 96 and the radius of curvature of the mirror surfaces 88 and 90 will increase or decrease in response to the expansion or contraction of the respective surface. The direction of expansion or contraction of the rear surface 90 is depicted by directional arrow 116. Front cooling channel 104 is depicted with front inlet port 118 and front outlet port 120 and rear cooling channel 106 includes rear inlet port 122 and rear outlet port 124.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A radius of curvature controlled mirror comprising:

a mirror having a front surface and a rear surface;

a first flow of fluid applied to said mirror for cooling or heating said front surface;

a second flow of fluid applied to said mirror for cooling or heating said rear surface;

a controller for adjusting said first flow and adjusting said second flow in order to achieve a desired differential expansion between said front surface of said mirror and said rear surface of said mirror and thereby achieve a desired radius of curvature on said front surface of said mirror;

said first flow of fluid includes a front cooling loop including a plurality of spiral-shaped front passageways in said mirror near said front surface and a fluid circulating through said front passageways;

said second flow of fluid includes a rear cooling loop including a plurality of spiral-shaped rear passageways in said mirror near said rear surface and a fluid circulating through said rear passageways;

said front cooling loop includes a front inlet port and a front outlet port;

said rear cooling loop includes a rear inlet port and a rear outlet port;

said fluid is at a constant temperature; and said mirror including a mirror body constructed of a material selected from the group consisting of silicon, silicon carbide, sapphire, and copper.

* * * * *